United States Patent [19]

Milin

[11] Patent Number: 5,248,958
[45] Date of Patent: Sep. 28, 1993

[54] HERTZIAN-WAVE INTRUSION DETETOR

[76] Inventor: Marcel Milin, 12, rue e Docteur Kurzenne, F-78350 Jouy en Josas, France

[21] Appl. No.: 801,615

[22] Filed: Nov. 27, 1991

Related U.S. Application Data

[63] Continuation-in-part of Ser. No. 571,579, Sep. 7, 1990, abandoned.

[30] Foreign Application Priority Data

Mar. 11, 1988 [FR] France ............................. 88 03201
Mar. 8, 1989 [WO] PCT Int'l
             Appl. .................. PCT/FR89/00093

[51] Int. Cl.$^5$ ............................................. G08B 13/18
[52] U.S. Cl. .................................... 340/552; 340/541
[58] Field of Search ............................... 340/552, 550

[56]       References Cited
       U.S. PATENT DOCUMENTS

| 3,689,888 | 9/1972 | Wootton | 340/550 |
| 4,027,276 | 5/1977 | Shaughnessy | 340/517 |
| 4,187,501 | 2/1980 | Olesch | 340/552 |
| 4,499,564 | 2/1985 | Sirai | 340/552 |
| 4,605,922 | 8/1986 | Blattman | 340/552 |

Primary Examiner—Jin F. Ng
Assistant Examiner—Christine K. Oda
Attorney, Agent, or Firm—Pearne, Gordon, McCoy & Granger

[57] ABSTRACT

The detector indicates the presence of a body (28) which is sufficiently conductive of Hertzian energy in a predetermined volume with the possibility of determining approximately its distance from the receiving aerial from a few millimeters to several meters. A stationary conductive body (28) has no effect on the detection mode. The electronic device consists essentially of an emitter (1) of pulses which are preferably modulated and, if necessary coded, a signal (10) from the emitter (1) after amplification (9) is radiated by the aerial (2). A receiver (13) receives directly the synchronization signal (4) and, if applicable, the coding signal (5) from the emitter (1). If a body (28) which is sufficiently conductive of Hertzian energy passes between or disappears from between the aerials (2, 2a, 26) and (11) the signal received on the aerial (11) varies sufficiently for the receiver (13) to act on a control (12) and signalling (15) mode.

11 Claims, 2 Drawing Sheets

HERTZIAN-WAVE INTRUSION DETETOR

This application is a continuation-in-part of U.S. application Ser. No. 07/571,579, filed Sep. 7, 1990, abandoned.

BACKGROUND OF THE INVENTION

The present invention relates to an electronic surveillance device making it possible in a predetermined space to detect and signal the presence or the absence of a body sufficiently conductive of hertzian-waves with the possibility of following its progress in the space to be controlled.

An electronic apparatus for detecting and signaling the presence of an object in a predetermined area is disclosed in U.S. Pat. No. 4,010,459. The apparatus, described in this patent, includes a micro-wave oscillator controlled by a modulator in order to obtain a hertzian-wave signal of 10 gigahertz modulated at 10 to 100 kilohertz. The signal is transmitted by a directional cornet horn type antenna. That apparatus is adapted to detect mobile material objects in industrial setting, but it is not adapted to discreetly detect a human intruder, taking into account that micro-waves signals are dangerous to the human body and that the predetermined space to control cannot be entirely covered by the radiation of the antenna, and that the antenna is too voluminous to be efficiently hidden and that, conventionally, the modulation signal is a constant low frequency triangular or square wave.

Another intrusion detector is disclosed in U.S. Pat. No. 4,605,922, the apparatus, described in this patent, includes a transmitter having a clock operating at a selected frequency, a pseudorandom code sequence generator for generating one of a selected number of codes, a modulator for spread spectrum modulating an electromagnetic signal with the generated pseudorandom code sequence signal and an antenna for transmitting the modulated signal through a zone of protection, and a receiver having an antenna, a demodulator for detecting and demodulating the signal, a clock operating at a frequency corresponding to the transmitter clock, a detector for comparing the received code signal, a phase detector, a control for phase synchronizing the two code signals, and a monitor for detecting and signalling changes in the detection signal resulting from entry or movement of an intruder in the zone of protection. That apparatus is adapted to detect mobile intruders only and it uses a micro-wave source and parabolic antenna, which have the inconveniences already cited above regarding discreet detection of persons.

SUMMARY OF THE INVENTION

The present invention is directed towards overcoming the problem and disadvantages of the prior means of intrusion detection. The concept of the present invention is to provide a hertzian-wave intruder detector which can be used for detecting a presence or a movement in a predetermined space.

In general, the intruder detector of the present invention includes means to detect and signals the presence or the absence of a body sufficiently conductive of hertzian-waves with the possibility of following its progress in the space to be controlled, consisting of a transmitter making possible the transmission of a preferably modulated and if necessary coded hertzian-wave transmission signal, a receiver making it possible to receive and use the different transmission signals sent by the transmitter characterized by the fact that the transmitter comprises an impulse generator whose impulses are sent to an amplifier which receives the modulation signal provided by a modulator and if it exists, the coding signal provided by a code generator, by the fact the amplified signal modulated and possibly coded is sent to the transmitting antenna, by the fact that the transmission signal radiated by the transmitting antenna crosses the airspace via the conductive body which acts like an intermediate antenna for reaching the receiving antenna of the receiving module, by the fact that the receiver is synchronized directly by a command signal sent by the transmitter making it possible for the receiver to use the means of an alarm controller and an alarm indicator after amplification of the transmission signal received on the receiving antenna, by the fact that the distance of the conductive body from the receiving antenna is obtained by an adjustment of the sensitivity threshold of the amplifier, by the fact that the approach or withdrawal of the conductive body in the space to be controlled is obtained by the intermediary of a pulse detector included in the receiver making it possible by measuring the signal received on the receiving antenna.

The working frequency of the transmitter is adjustable from several tenths of a hertz to several megahertz.

The power radiated by the transmitting antenna can be adjusted as desired by a power amplifier.

The transmitting signal must be coded, the code provided by a code generator is included in the command and transmission signal.

The impulses transmitted to the transmitting antenna are negative.

The transmitting antenna comprises an aerial part to control a predetermined space and a ground part to control a predetermined area, the two parts being with each other.

The present invention has the advantage of being able to work in a predetermined space or on predetermined area and the fact that the target is immobile or mobile does not enter into the detection mode. Among others advantages, the detection distance can be adjusted depending on the need, from several millimeters to several meters.

Depending on the mode chosen, the element to be detected can be within the proximity of the transmitting antenna or between the two antennas. The radiation of hertzian energy caused by the sufficiently conductive body plays a very important role, depending on its position between the antennas. Indeed, the closer the conductive body is to the transmitting antenna, the greater the energy radiated towards the receiving antenna. This effect will be astutely used to determine the approximate distance of the conductive body from the receiving antenna; moreover, the immobility of the conductive body is not important in the detection mode. The absence of the same conductive body can also be signaled. The device cited as an example is in no way limiting but, on the contrary, encompasses all variations.

BRIEF DESCRIPTION OF THE DRAWINGS

The invention is described below in a particular but non restrictive embodiment with reference to the figures.

DETAILED DESCRIPTION OF THE PREFERRED EMBODIMENT

Figure 1:
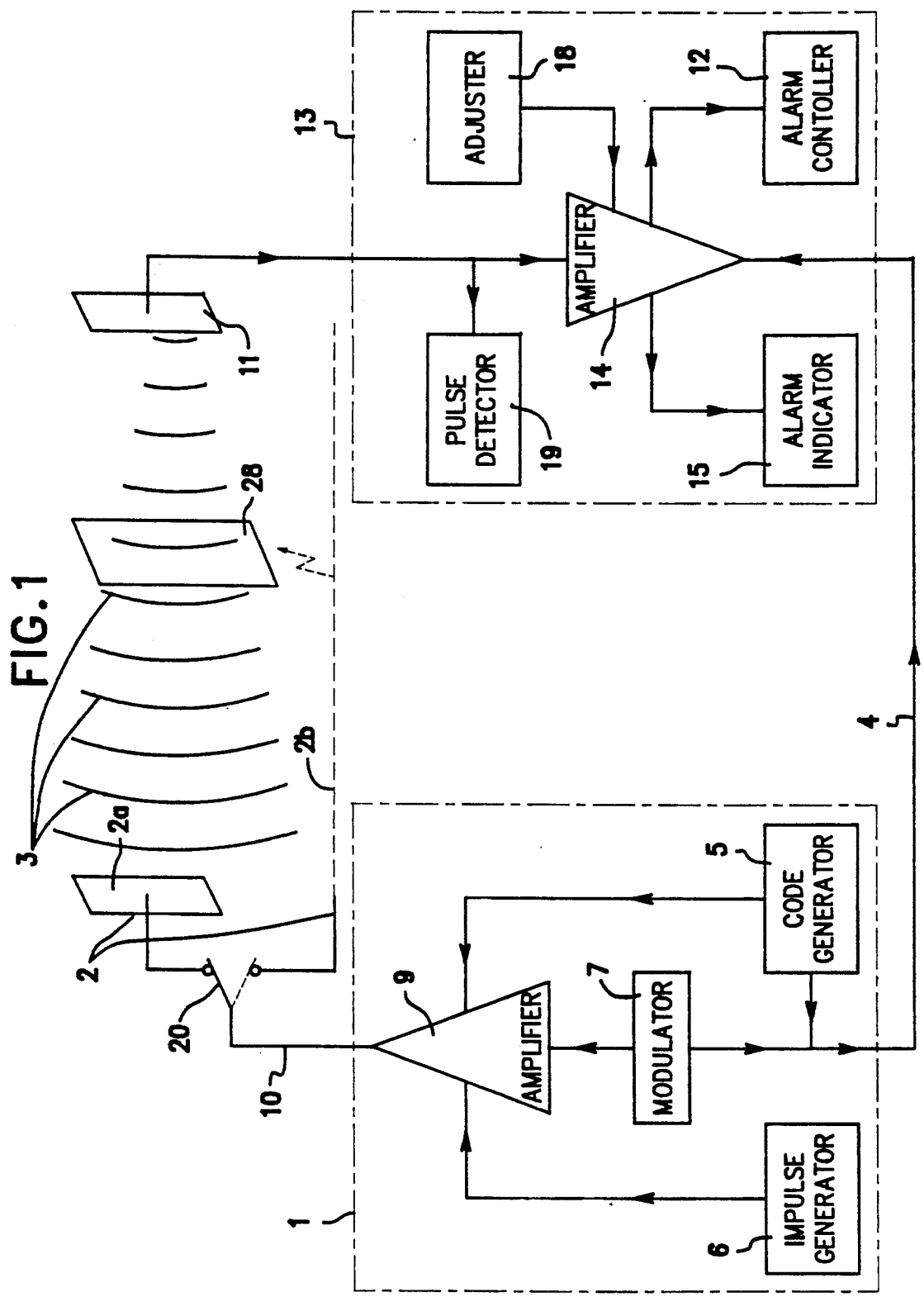
FIG. 1: is a functional block diagram of a hertzian wave intruder detector embodying the present invention.

As shown in the drawings for purposes of illustration in particular in the FIG. 1, the present invention is principally embodied in a hertzian-wave intrusion detector using a transmitter 1 composed of an impulse generator module 6, a code generator 5, a modulator 7 and an amplifier 9; and of a receiver 13 composed of an amplifier 14 with adjuster of sensitivity 18, receiving signal 4 coming from the transmitter 1, an alarm controller 12, an alarm indicator 15 and a pulse detector 19. Signal 10 from the transmitter 1 after amplifier by amplifier 9 is radiated by the transmitting antennas 2a or 2b according to the position of the selector 20. Receiver 13 receives directly the synchronization signal 4 coming from the modulator 7 of the transmitter 1 and, if applicable, the coding signal provided by the code generator 5 of the transmitter 1. Signal 10 radiated by the transmitting antenna 2 is received by the receiving antenna 11, which transmits the received signal to pulse detector 19 and amplifier 14 to act on an alarm controller 12 and an alarm indicator 15 in response to the sensitivity adjusted by the adjuster 18. If a body 28, which is sufficiently conductive of hertzian energy, appears, passes or disappears from between the antennas 2,11, the signal received on the receiving antenna 11 varies sufficiently for the receiver 13 to act on alarm controller 12 and alarm indicator 15.

Impulse generator 6 of the transmitter 1 works in a frequency range oscillating from several tenths of a hertz to several megahertz. In order to reduce the risks of ill-timed signals caused by potential interference, a signal 4 given off by the modulator 7 of the transmitter 1 synchronizes the receiver 13 so that it is blocked when the transmitting antenna 2 is not transmitting. Modulation in the transmission signal is preferred and in the case of premises that have significant amounts of interference or require special security, a coding signal coming from the code generator 5 is desirable. The transmission signal sent out by the impulse generator 6 and the modulator 7 is amplified by the amplifier 9 and sent to the transmitting antennas 2a or 2b in resonse to the position of the selector 20. In this case, the receiver 13 is quite simply: an amplifier 14 which directly receives the synchronization signal 4 from the transmitter 1 and, if necessary, the coding signal 5. The signal 3 sent by the transmitting antenna 2 is received through the air space on the receiving antenna 11 via or not the conductive body 28.

Two situations can occur.

First case: in the absence of the conductive body 28, the signal received by the receiver 13 is considered insufficient and does not exceed the predetermined signal threshold. Placing a sufficiently conductive body 28 between the antennas 2 and 11 causes the receiver to react, which then activates the means 12 and 15 of command and signaling. Moreover, the detection distance can be adjusted as desired by acting on the transmission power 9 or more simply by the adjuster 18 of the sensitivity of the receiver 13.

Second case: it must be noted that when the sensitivity of the receiver is carefully adjusted to its starting threshold without the conductive presence between the antennas 2 and 11, placing a sufficiently conductive body 28 between these two antennas has the effect of creating a certain attenuation of the signal received on the receiving antenna 11, thus making the chosen means of activation 12 and signaling 15 react. Combining the two cases described makes a large number of applications possible, with a transmitter that can serve one or more receivers set differently to follow, for example, the progress of an intruder into a room until the time when he attempts to take or to get very close to an object to be protected, in particular in using the transmitting antenna 2b hidden under a carpet to control an area, or in using transmitting antenna 2b to control the whole determined space.

It is also possible, using a single receiver, to follow the progress of the conductive body the closer it gets to or the farther it moves away from the receiving antenna 11. Indeed, the closer the conductive body 28 gets to the receiving antenna 11, the greater the signal 3 received: this suffices to cause a pulse detector 19 on the receiver 13 to react, which indicates the amplitude of the signal received on the antenna 11.

Obviously, the transmitting antenna 2 will change depending on the mode of detection chosen: from having only a small radiation surface to monitor a precise spot, it could go so far as to cover the area of the space to be monitored in order to follow the progress of the conductive object 28 in the space to be controlled, for example.

Figure 2:
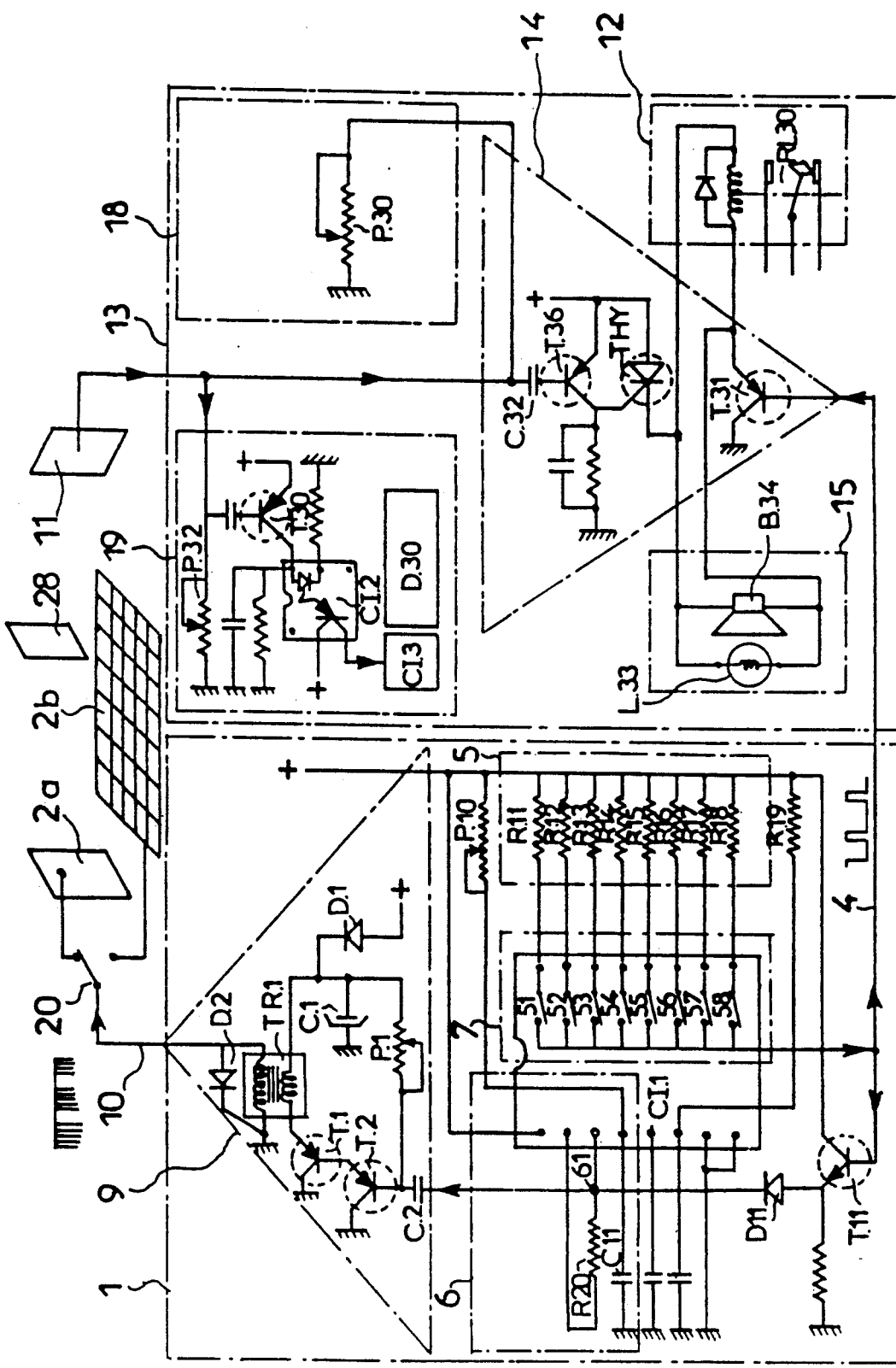
FIG. 2: is an electrical schematic drawing of the hertzian-wave detector of FIG. 1.

Best mode for carrying out the invention is shown on the FIG. 2 of the drawings, we can see the principal components of a hertzian-wave intrusion detector corresponding to the present invention.

TRANSMITTER

With reference to the functional block diagram of FIG. 1 for the transmitter 1, code generator 5, impulse generator 6 and modulator 7, which provide a signal to amplifier 9 are principally composed of a intearated circuit CI1 (R2240 EXAR) temporizer-counter-programable which provide on terminal 61 negative impulses adjustable in frequency by capacitor C11 and adjustable resistance P10 which together constitute a resonant circuit. Terminal 51 to 58 provide, in combination with resistance R11 to R18 of modulator 7, square signal modulated from 1 RC to 128 RC. The signal provided to amplifier 9 is amplified by a transistor T2 (PNP large gain) and a transistor T1 (PNP hight power), a step-up transtomer TR1, a positive voltage limiting diode D2, a potentiometer P1 to adjust the power of the transmitter, a capacitance C1 to store up the power for the transmission and a diode D1. The wave form of the signal 4 provided by transmitter 1 to receiver 13 is controlled by a transistor T11 (NPN) which lets the signal pass when the positive parts of the modulated square signal are applied on it. A positive signal recovered on the transmitter is applied by a transistor D11 (NPN) which lets pass the signal towards terminal 61 of printed circuit PC1 of the impulse generator 6 neutralizing like this the negative impulses. When the modulated square signal becomes negative the transmission start again because resistances R11 to R18 allow at the terminal chosen a negative square modulated signal to be generated.

RECEIVER

With reference to of FIG. 2, pulse detector 19 is provided a signal received from the receiving antenna 11 and is after adjusting by a potentiometer P32, applied to a transistor large gain amplifier T30 followed by a optoisolator CI 2 able to insulate CI 3 and D30 components corresponding respectively to a dial to use for analyzing the power of the signal received by the receiving antenna 11 and to a light spot scanner D30.

Amplifier 14 receives a signal coming from receiving antenna 11 comprising a transistor T36, (PNP large gain) which provides the signal to the trigger of a thyristor THY with positive voltage on its anode. A cathodic circuit shunts through the coil of the relay contact RL30 of the emitter of the alarm indicator 15 and the transistor T31 (PNP) which receives on its base the signal 4 coming from transmitter 1, which becomes conducting when a negative signal, that it to say when the negative part of the square signal 4 is applied on the base of transistor T31, at the same moment relay contact RL 30 let pass the current towards the light alarm L33 or the loud alarm B34. The level of starting of the thyristor THY can be adjusted with the potentiometer of the sensitivity adjustment block 18.

FUNCTIONING

Square signal, synchronized by square impulses of 1 RC duration applied on terminal 51 progress in function of the contacts 51 to 58, from 1 RC to 120 RC. That circuit is activated by the resistance R11 to R18 and constitutes the modulator. The contacts 51 to 58 permit coding the signal as a function of the resistances put in order. That assembly constitutes the code generator 5.

The impulses received by the amplifier 9 throught its capacitor C2 are amplified by a Darlington assembly composed of transistor T1 and T2 which commands controls the steps up transformer TR1. The negatives impulses 10 are provided to the transmitting antenna 2 (2a or 2b).

The synchronization signal 4 coming from the modulator 7 and from the code generator 5 is provided to the base of the transistor T11 rendering it, conductive for positive parts of the signal 4, and consequently the voltage of the emitter of the transistor T11 provided to terminal 61 is negative, which neutralizes the impulses towards the amplifier 9.

The impulse received by receiving antenna 11 from the transmitting antenna 2a or 2b, via or not the conductive body 28 are received by amplifier 14 and by pulse detector 19. After amplification by transistor T30 and by the opto-isolator CI2; pulse detector 19 acts by the intermediate of the dial CI 3 on the light spot scanner D30 (type LED) in which the light intensity is a function of the amplitude of the signal received by the antenna for 11. Amplifier 14 which the sensibility level is adjusted by potentiometer P30 of block 18, receives on the base of the transistor T36 through the capacitor C32, the signal coming from the receiving antenna 11. After amplification, the impulse received command the tyristor THY which becomes conductor according to the following conditions.

1) Signal applied on its trigger is sufficient, 2) synchronization signal 4 is in its negative part, in order to put the transistor T31 conductive which finds the ground level on its emitter, permitting to relay RL30 to invert its contact, in view permit to alarm controller 12 to undertake its functions of command. It is the same for alarm indication 15 which will undertake its functions of signalling.

The antennas 2a and 2b are chosen as a function of the target. Antenna 2b can be chosen for following the intruder movements. The more the intruder approaches the receiving antenna 11 the more the receipted signal is important. That antenna can be hidden under a carpet or other material permitting hertzian energy to pass.

The antenna 2a permits, if it is actived, to signal the approach of the intruders hand to the receiving antenna 11 which can be hidden behind a precious object in a museum for example. If the receiving antenna is very small, the approach of a finger is sufficient to start the alarm.

I claim:

1. An electronic surveillance device to detect and signal the presence of a Hertizian-wave conducting body between a transmitting antenna and a receiving antenna, comprising a transmitter for creating and transmitting a modulated-impulse transmission signal and a receiver to receive the transmission signal sent by the transmitter, wherein the transmitter comprises an impulse generator whose impulses are sent to an amplifier which receives a modulation signal from a modulator, said amplifier amplifying and modulating said impulses to create the modulated-impulse transmission signal, said transmission signal being transmitted by the transmitting antenna through airspace, a portion of the transmission signal being received by the receiving antenna via the conducting body to create a received signal, a synchronization command signal being supplied by the transmitter to the receiver to enable an amplifier provided by the receiver to amplify the received signal and actuate an alarm controller and an alarm indicator when said received signal exceeds a minimum threshold level, said minimum threshold level being adjustable by adjustment means to set a maximum distance said conducting body can be from the receiving antenna to actuate the alarm controller and alarm indicator.

2. A device according to claim 1, wherein a working frequency of the transmitter (1) is adjustable from several tenths of a hertz to several megahertz.

3. A device according to claim 1, wherein power of the transmission signal radiated by the transmitting antenna (2) is adjustable via the amplifier (9).

4. A device according to claim 1, wherein a code provided by a code generator (5) is included in the synchronization command signal (4) and the transmission signal (3).

5. A device according to claim 1, wherein the transmitting antenna (2) comprises an aerial part (2a) and a ground part (2b).

6. A device according to claim 1, wherein the modulator (7) comprises a programmable printed circuit.

7. An electronic surveillance device to detect and signal the presence of a Hertzian-wave conducting body between a transmitting antenna and a receiving antenna, comprising a transmitter for creating and transmitting a modulated-impulse transmission signal and a receiver to receive the transmission signal, wherein the transmitter comprises an impulse generator whose impulses are sent to an amplifier which receives a modulation signal from a modulator, said amplifier amplifying and modulating said impulses to create the modulated-impulse transmission signal, said transmission signal being transmitted by the transmitting antenna through airspace, a portion of the transmission signal being received by the receiving antenna via the conducting body to create a received signal, a synchronization command signal being supplied by the transmitter to the receiver to enable an amplifier provided by the receiver to amplify the received signal and actuate an alarm controller and an alarm indicator when said received signal exceeds a minimum threshold level, said minimum threshold level being adjustable by adjustment means to set a maximum distance said conducting body can be from the receiving antenna to actuate the alarm controller and alarm indicator, wherein said transmission signal has a frequency of between 0.50 Hz and 10 kHz.

8. A device according to claim 7, wherein power of the transmission signal radiated by the transmitting antenna (2) is adjustable via the amplifier (9).

9. A device according to claim 7, wherein a code provided by a code generator (5) is included in the synchronization command signal (4) and the transmission signal (3).

10. A device according to claim 7, wherein the transmitting antenna (2) comprises an aerial part (2a) and a ground part (2b).

11. A device according to claim 7, wherein the modulator (7) comprises a programmable printed circuit.

* * * * *